US011868422B2

(12) United States Patent
Corley et al.

(10) Patent No.: US 11,868,422 B2
(45) Date of Patent: Jan. 9, 2024

(54) DYNAMIC LINK PREVIEW GENERATION

(71) Applicant: eBay Inc., San Jose, CA (US)

(72) Inventors: Tyler Rolan Corley, San Francisco, CA (US); Winfred James Jebasingh, San Jose, CA (US); Damodaran Chingleput Sathyakumar, Campbel, CA (US); Shobith Srinivas Alva, Santa Clara, CA (US); Jack Charles Maize, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/557,465

(22) Filed: Dec. 21, 2021

(65) Prior Publication Data

US 2022/0114230 A1    Apr. 14, 2022

Related U.S. Application Data

(63) Continuation of application No. 16/986,581, filed on Aug. 6, 2020, now Pat. No. 11,238,126, which is a
(Continued)

(51) Int. Cl.
*G06F 17/00*    (2019.01)
*G06F 16/955*    (2019.01)
(Continued)

(52) U.S. Cl.
CPC ...... *G06F 16/9558* (2019.01); *G06F 16/9577* (2019.01); *G06F 16/986* (2019.01); *G06N 20/00* (2019.01); *G06Q 50/01* (2013.01)

(58) Field of Classification Search
CPC ............ G06F 16/9558; G06F 16/9577; G06F 16/986; G06F 16/9566; G06N 20/00;
(Continued)

(56) References Cited

U.S. PATENT DOCUMENTS

| 6,128,663 A | 10/2000 | Thomas |
| 6,470,378 B1 | 10/2002 | Tracton et al. |

(Continued)

FOREIGN PATENT DOCUMENTS

| WO | 2020/142124 A1 | 7/2020 |
| WO | 2020/142124 A8 | 5/2021 |

OTHER PUBLICATIONS

Non-Final Office Action received for U.S. Appl. No. 16/237,541, dated Mar. 3, 2020, 17 pages.
(Continued)

*Primary Examiner* — Laurie A Ries
(74) *Attorney, Agent, or Firm* — FIG. 1 Patents (57) ABSTRACT

Dynamic link preview generation techniques are described that overcome the challenges of conventional techniques by supporting link preview generation by a content provider system that proves the digital content via a respective network address. In one example, a content provider system, based on a request received from a service provider system, identifies a communication platform of the service provider system that is to be used to communicate the shared link. Upon identifying the communication platform, the content provider system locates customization data that describes how the link preview is to be generated for the communication platform. In response, the content provider system renders digital content available via the network address to generate the link preview.

20 Claims, 8 Drawing Sheets

Related U.S. Application Data continuation of application No. 16/237,541, filed on Dec. 31, 2018, now Pat. No. 10,754,909.

(51) Int. Cl.
*G06F 16/957* (2019.01)
*G06N 20/00* (2019.01)
*G06Q 50/00* (2012.01)
*G06F 16/958* (2019.01)

(58) Field of Classification Search
CPC .......... G06N 3/08; G06N 5/003; G06N 7/005; G06N 20/20; G06Q 50/01
See application file for complete search history.

(56) References Cited

U.S. PATENT DOCUMENTS

| | | | |
|---|---|---|---|
| 7,162,493 B2 | 1/2007 | Weiss et al. | |
| 7,319,470 B2* | 1/2008 | Shigetake | G06F 16/9577 345/636 |
| 7,958,457 B1 | 6/2011 | Brandenberg | |
| 8,577,671 B1* | 11/2013 | Barve | G06F 16/2457 715/752 |
| 8,577,957 B2 | 11/2013 | Behar et al. | |
| 8,621,025 B2 | 12/2013 | Ridgard et al. | |
| 8,732,853 B1* | 5/2014 | Byrne | H04L 63/08 726/28 |
| 9,197,940 B2 | 11/2015 | Mccarthy et al. | |
| 9,224,172 B2 | 12/2015 | Churchill et al. | |
| 9,529,784 B2 | 12/2016 | Hayden | |
| 9,749,202 B1* | 8/2017 | Jain | H04L 67/14 |
| 9,916,285 B2 | 3/2018 | Su | |
| 9,990,114 B1* | 6/2018 | Horton | G06F 3/0482 |
| 10,754,909 B2 | 8/2020 | Corley et al. | |
| 10,848,798 B2 | 11/2020 | Kwak et al. | |
| 11,238,126 B2 | 2/2022 | Corley et al. | |
| 2002/0129051 A1 | 9/2002 | Abdelhadi et al. | |
| 2002/0174010 A1 | 11/2002 | James, III | |
| 2003/0063072 A1 | 4/2003 | Brandenberg et al. | |
| 2004/0032393 A1 | 2/2004 | Brandenberg et al. | |
| 2005/0198299 A1 | 9/2005 | Beck et al. | |
| 2007/0038567 A1 | 2/2007 | Allaire et al. | |
| 2007/0239528 A1 | 10/2007 | Xie et al. | |
| 2011/0173188 A1* | 7/2011 | Walsh | G06F 16/9577 707/E17.014 |
| 2012/0036552 A1 | 2/2012 | Dare et al. | |
| 2013/0073388 A1 | 3/2013 | Heath | |
| 2013/0080421 A1* | 3/2013 | Taylor | G06F 16/954 707/E17.014 |
| 2013/0095864 A1 | 4/2013 | Marovets | |
| 2013/0205187 A1* | 8/2013 | Hawkins | G06F 16/9558 715/208 |
| 2013/0298038 A1 | 11/2013 | Spivack et al. | |
| 2014/0006930 A1 | 1/2014 | Hollis et al. | |
| 2014/0136973 A1* | 5/2014 | Kumar | G06F 16/9574 715/274 |
| 2014/0229270 A1 | 8/2014 | Rashwan | |
| 2014/0279032 A1 | 9/2014 | Roever et al. | |
| 2015/0127628 A1 | 5/2015 | Rathod | |
| 2015/0143211 A1 | 5/2015 | Kaufthal et al. | |
| 2015/0163318 A1* | 6/2015 | Bergman | H04L 67/568 709/213 |
| 2015/0220499 A1* | 8/2015 | Katic | G06F 40/106 715/207 |
| 2015/0220500 A1* | 8/2015 | Katic | G06F 40/106 715/207 |
| 2015/0278234 A1* | 10/2015 | Masterson | G06F 16/9577 715/234 |
| 2016/0147836 A1* | 5/2016 | Liu | G06F 40/134 715/208 |
| 2016/0255139 A1 | 9/2016 | Rathod | |
| 2016/0359957 A1 | 12/2016 | Laliberte | |
| 2017/0083505 A1* | 3/2017 | Whitman | G06F 16/319 |
| 2017/0142076 A1 | 5/2017 | Ford et al. | |
| 2017/0177194 A1 | 6/2017 | Lyons et al. | |
| 2017/0177552 A1* | 6/2017 | Hayden | G06F 16/954 |
| 2017/0270006 A1 | 9/2017 | Kandylas et al. | |
| 2017/0373993 A1* | 12/2017 | Schmid | G06F 3/0482 |
| 2018/0173682 A1 | 6/2018 | Yoo et al. | |
| 2018/0268253 A1 | 9/2018 | Hoffman et al. | |
| 2019/0066664 A1 | 2/2019 | Miller et al. | |
| 2019/0108419 A1* | 4/2019 | Coven | G06F 9/44505 |
| 2019/0173814 A1 | 6/2019 | Mcneill | |
| 2019/0384850 A1* | 12/2019 | Lo | G06F 16/901 |
| 2020/0201818 A1* | 6/2020 | Khajuria | G06F 16/176 |
| 2020/0210510 A1 | 7/2020 | Corley et al. | |
| 2020/0364284 A1 | 11/2020 | Corley et al. | |

OTHER PUBLICATIONS

Notice of Allowance received for U.S. Appl. No. 16/237,541, dated Jun. 10, 2020, 10 Pages.
Non Final Office Action Received for U.S. Appl. No. 16/986,581, dated May 21, 2021, 16 Pages.
Notice of Allowance Received for U.S. Appl. No. 16/986,581, dated Sep. 22, 2021, 12 pages.
International Preliminary Report on Patentability Received for PCT Patent Application No. PCT/US2019/055370, dated Jul. 15, 2021, 7 pages.
International Search Report Received for PCT Patent Application No. PCT/US2019/055370, dated Jan. 27, 2020, 3 Pages.
International Written Opinion received for PCT Patent Application No. PCT/US2019/055370, dated Jan. 27, 2020, 5 pages.
Tyler et al., "Engaging Link Previews", Retrieved from Internet URL: https://skunkworks.corp.ebay.com/ideas/5b0f24922cb7c624817e2151, May 30, 2018, pp. 1-3.
19906674.7, "Extended European Search Report", European Patent Application No. 19906674.7, dated Jul. 14, 2022, 10 pages.
10-2021-7011530, "Notice of Allowance", KR Application No. 10-2021-7011530, dated May 3, 2023, 6 pages.

* cited by examiner

802
Receive data describing user interaction with link previews and characteristics of the link previews, the link previews generated based on use by respective communication platforms to preview digital content available via a respective network address

804
Generate a model that describes the user interaction with the link previews

806
Customize generation of subsequent link previews based on the generated model

*Fig. 8*

Fig. 9

DYNAMIC LINK PREVIEW GENERATION

RELATED APPLICATIONS

This application is a continuation of and claims priority to U.S. patent application Ser. No. 16/986,581, filed Aug. 6, 2020, and titled "Dynamic Link Preview Generation", which claims priority to U.S. patent application Ser. No. 16/237,541, filed Dec. 31, 2018, and titled "Dynamic Link Preview Generation", the entire disclosures of which are hereby incorporated by reference.

BACKGROUND

A multitude of digital content may be accessed by users of computing devices via network addresses as part of the Internet. For example, there are millions of websites, each having a multitude of webpages that are usable to access digital images, animations, audio content, multimedia content, and so forth. Initially, in order to share access or awareness of this digital content, a user of a computing device copied the network address and sent it to another user of another computing device as text. Oftentimes, however, these network addresses are difficult to parse and accurately copy, thereby resulting in user frustration and computational inefficiencies caused by repeated attempts.

Accordingly, subsequent techniques have been developed to share the network address using a link preview. However, these techniques lack richness and are implemented either locally at the user's device or by a communication platform, via which, the link is to be shared. As a result, control of link generation is assumed by user's device or communication platform and is not configured to address the wide range of digital content that is available via the multitude of webpages. In one conventional example, a user may wish to share a link to a webpage with another user via a messaging communication platform. In response, the messaging communication platform typically selects the first image available via the webpage and a title of the page as the link preview. Thus, the generation of the link preview is controlled by the messaging communication platform and not a content provider of the webpage.

Although conventional techniques have been developed that involve Open Graph (OG) metadata, these techniques support a limited ability for the content provider to indicate which content is available via the webpage and still do not support an ability to control how content is used to generate a link preview. As such, conventional link preview generation techniques do not support an ability of a content provider to control generation of link previews that are communicated by other devices. This limits an ability of these systems to control their digital content and missed opportunities to expand a richness of this content when shared as part of link previews by devices "outside" of the content provider system.

SUMMARY

Dynamic link preview generation techniques are described that overcome the challenges of conventional techniques by supporting link preview generation by a content provider system that proves the digital content via a respective network address. In one example, a content provider system, based on a request received from a service provider system, identifies a communication platform of the service provider system that is to be used to communicate the shared link. This may be performed in a variety of ways, including based on a network domain, from which, the content request is received, as part of an Open Graph protocol request, and so forth.

Upon identifying the communication platform, the content provider system locates customization data that describes how the link preview is to be generated for the communication platform. The customization data may specify which portions of the digital content are to be included in the link preview, a size and/or aspect ratio of the digital images, resolution, colors, and so forth.

In response, the content provider system renders digital content available via the network address at the appropriate size, e.g., aspect ratio, resolution, etc. This rendered digital content may then be cached as well as communicated to the service provider system for use as a link preview between the first and second client devices, e.g., via the communication platform. In this way, the link preview may be customized to address "how" the link preview is communicated via the communication platform and also control "what" is included in the link and as such provides a degree of control of exposure of digital content to the content provider system that is not possible using conventional techniques. Further discussion of these and other examples is included in the following sections and shown in corresponding figures.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional link preview generation techniques do not support an ability of a content provider system that makes digital content available via a network address (e.g., URL) to control how a link preview is generated to share awareness and access to that digital content. This limits an ability of the content provider system to expand a richness of link previews using conventional techniques, including what digital content is included in the link preview and how that digital content is displayed as part of the link preview.

Accordingly, dynamic link preview generation techniques are described that overcome the challenges of conventional techniques by supporting link preview generation by a content provider system that proves the digital content via a respective network address. In one example, a user of a first client device may wish to share a network address (e.g., link) with a user of a second client device via a communication platform of a service provider system. The communication platform may be configured in a variety of ways, such as to support instant messaging, social network communications (e.g., "shares" or posts), electronic messages, email, and so forth. Examples of communication platforms include Apple® iMessage® and are also supported as part of social network systems including Facebook®, Instagram®, LinkedIn®, Snapchat®, and so forth.

The service provider system thus receives an input from the first client device in this example to share a network address with the second client device. In response, the service provider system generates a content request to a content provider system that makes the digital content available via the network address, e.g., a URL. The content provider system, based on the request, identifies a communication platform of the service provider system that is to be used to communicate the shared link. This may be performed in a variety of ways, including based on a domain, from which, the content request is received, as part of an Open Graph protocol request, and so forth.

Upon identifying the communication platform, the content provider system locates customization data that describes how the link preview is to be generated for the communication platform. The customization data may specify which portions of the digital content are to be included in the link preview, a size and/or aspect ratio of the digital images, resolution, colors, and so forth. In this way, the customization data may be used to address nuances of the communication platform. The customization data, for instance, may indicate an appropriate size to be used as part of the link preview.

In response, the content provider system renders digital content available via the network address at the appropriate size, e.g., aspect ratio, resolution, etc. This rendered digital content may then be cached as well as communicated to the service provider system for use as a link preview between the first and second client devices, e.g., via the communication platform. The link preview is selectable by the second client device to support navigation to digital content available via the network address and also provides information indicative of what digital content is available via the network address.

In the example above, for instance, the link preview may be customized to address "how" the link preview is communicated via the communication platform, e.g., a size of the link preview, orientation of a user interface to be used to display the link preview, colors used by a user interface of the communication platform, and so on. The customization data may also be used to specify which portions of the digital content are to be included in the link preview, which may differ based on the communication platform that is to be used to communicate the link preview. A first communication platform, for instance, may support communication of link previews having a smaller digital image size or orientation than that supported by another communication platform. Accordingly, the content provider system may leverage customization data to support generation of link previews that take into account these differences in display characteristics. As a result, the link preview may be generated in a variety of different ways based on the communication platform that is to be used to communicate the link preview.

Other considerations are also contemplated that do not involve a communication platform used to communicate the preview, e.g., temporal considerations (i.e., time) such as a holiday or time of day at which the request is received, geographical considerations, demographic data corresponding to a user for the first and/or second client device, and so forth. Further, the link may be configured to be interactive to support user interaction before being used to initiate navigation to a corresponding network address. The link, for instance, may output an animation responsive to detection of a "hover" (e.g., gesture, cursor) over the link, provide a digital video, include game or question and answer functionality, and so forth.

In one example, the preview may be personalized based on a user that initiates generation of the link for sharing and/or for a user that is to receive the generated link. The content provider system, for instance, may also employ the customization data to increase a likelihood of initiation of a user action by a user of a client device that receives the link preview. The content provider system, for instance, may generate a model based on monitored user interaction with past link previews, e.g., whether the link preview is used to navigate to the network address, whether navigation caused conversion of a good or service associated with the digital content (e.g., as digital marketing content), employed as part of A/B testing, and so on. This may be based on a user that initiates generation of the link and/or a user that is to receive the link and thus may address both users as part of dynamically generating the link.

The model may then be used to select particular portions of the digital content for inclusion in subsequent link previews, how the portion of the digital content are to be displayed, configuration of display characteristics (e.g., colors) of the link preview itself, and so on. The link, for instance, may be generating dynamically based on user interaction with advertisements included within the link. A variety of other customizations are also contemplated. In this way, the content provider system may achieve a variety of advantages by controlling generation of the link preview that is not possible using conventional link preview generation techniques that are implemented solely "outside" of the content provider system.

In an implementation, the content request is received from the service provider system in an attempt to crawl digital content associated with the network address to generate the preview. However, in this implementation at least one network address appears as a digital content asset (e.g., a digital image such as "https:contentprovidersystem.comimage.jpeg" as part of Open Graph metadata) but actually initiates generation of the link preview by the content provider system as described above. As a result, the link preview may still be generated based on the content provider system even for service provider systems that attempt to generate link previews, themselves. Further discussion of these and other examples is included in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
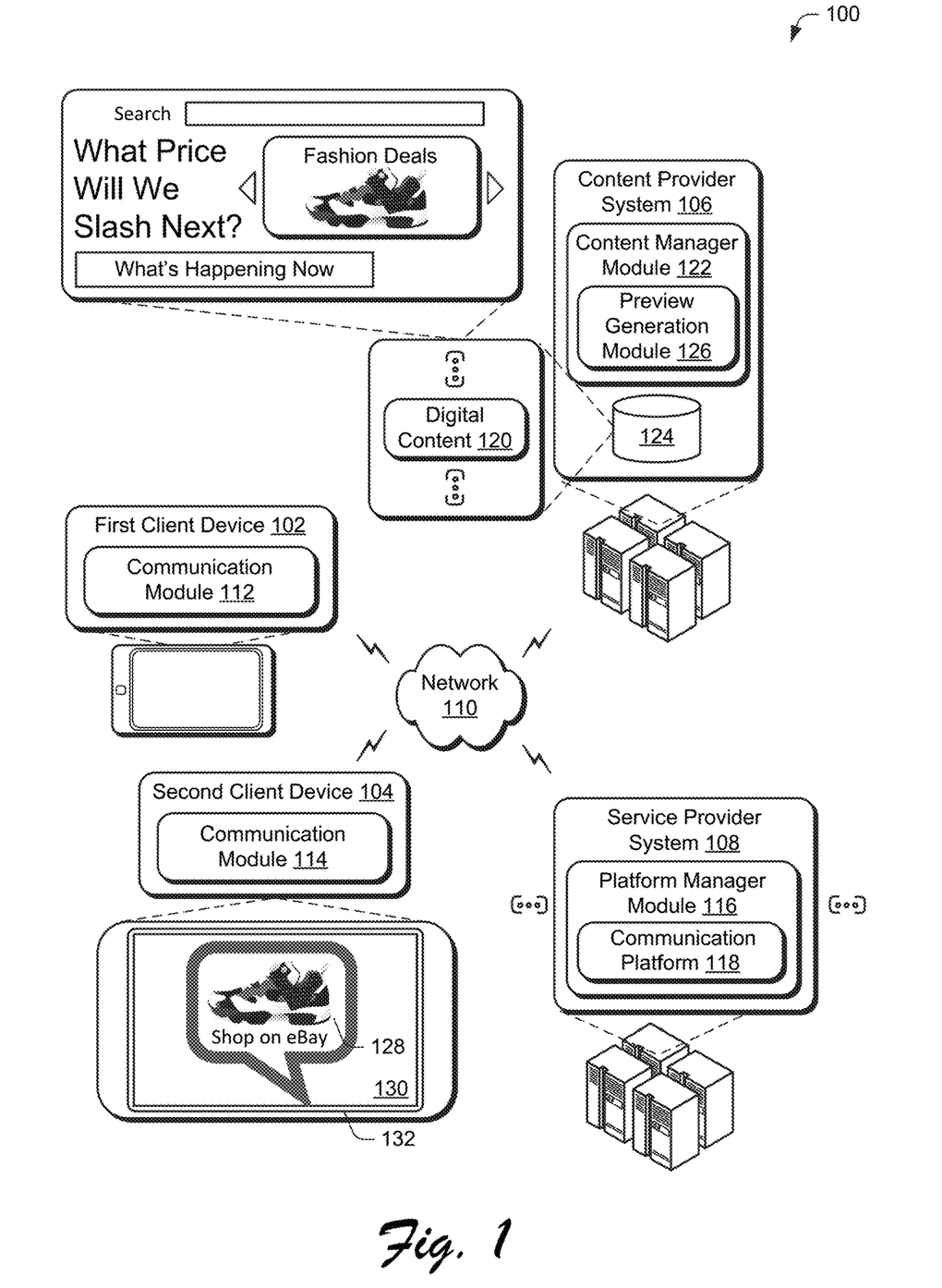
FIG. 1 is an illustration of an environment in an example implementation that is operable to employ dynamic link preview generation techniques described herein.

FIG. 1 is an illustration of a digital medium environment 100 in an example implementation that is operable to employ dynamic link preview generation techniques described herein. The illustrated environment 100 includes a first client device 102, a second client device 104, a content provider system 106, and a service provider system 108 that are communicatively coupled, one to another, via a network 110. Computing devices that implement these devices and systems may be configured in a variety of ways.

A computing device, for instance, may be configured as a desktop computer, a laptop computer, a mobile device (e.g., assuming a handheld configuration such as a tablet or mobile phone as illustrated for the first and second client devices), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is depicts and described in some instances, a computing device may be representative of a plurality of different devices, such as multiple servers utilized by a business to perform operations "over the cloud" for the content and service provider systems 106, 108 and as further described in relation to FIG. 9.

The first and second client devices 102, 104 are communicatively coupled via the network 110 using respective communication modules 112, 114 to communicate using the service provider system 108 as an intermediary. The illustrated service provider system 108, for instance, is representative of one of several different service provider systems that are configured to support communication between the devices through use of a platform manager module 116 and a communication platform 118. The platform manager module 116 is representative of functionality that supports this communication using the communication platform 118 via the network 110.

Communications supported by the communication platform 118 between the first and second client devices 102, 104 may be configured in a variety of ways. Examples of configurations of communications include instant messages, posts, emails, text messages and so on that may be communicated via a variety of communication platforms 118. Examples of communication platforms 118 include Apple® iMessage®, Google® Android® Messages, Facebook® instant messages and posts, Instagram® images and direct messages, LinkedIn® posts and messages, WhatsApp® instant messages, 9®, WeChat®, Tumblr®, Twitter® tweets, Skype®, Pinterest® photo sharing and bookmarking, YouTube® videos and comments, and many others. As such, communications that are transmitted and received via the multitude of communication platforms 118 available to the first and second client devices 102, 104 may support different amounts, orientations and arrangements of digital content, one to another.

In some instances as previously described, users may wish to share information about digital content they have located that is accessible via the network 110. Suppose a user of the first client device 102, for instance, interacts with the communication module 112 to access digital content 120 managed by a content manager module 122, which is stored in a storage device 124 of a content provider system 106. The digital content 120 may be configured in a variety of ways, such as webpages, digital images, digital audio, digital video and multimedia content, documents, and so forth that is made available via a network address (e.g., uniform resource locator) by the content manager module 122.

In the illustrated example, the digital content 120 is configured as a webpage that includes a variety of different portions including a search bar, tag line, dynamic digital images that are scrolled through automatically, a sub-header, and so forth. A user of the first client device 102 that views this webpage may then wish to make a user of the second client device 104 aware of the webpage by sharing a link to a network address of the webpage via the communication platform 118.

As previously described, conventional techniques used to generate a link preview are performed at the client device or service provider system 108, and are not supported at the content provider system 106. In one conventional example, structured metadata (e.g., in accordance with an Open Graph protocol) is added to a header section of the webpage to identify items of digital content that are available via the webpage, e.g., "og:title" for a title and "og:image" for an image. The service provider system that is to generate the link preview in this conventional example then generates the link preview as desired based on the identified items from the digital content. As a result, the content provider system is not given a degree of control as to how the digital content, as a link preview, is shared by the service provider system.

In the techniques described herein, however, the content provider system 106 employs a preview generation module 126 to generate the link preview 128 that is then shared by the service provider system 108, even in an instance in which the service provider system 108 is also configured to generate the link preview. Continuing with the previous example, for instance, the service provider system 108 may make a request for a title and an image based on the Open Graph tags, e.g., "og:title" for a title and "og:image" for an image. In this example, however, the network address of the "og:image" tag for the digital image causes the preview generation module 126 to generate a link preview 128, if not already generated and available via a cache. As a result, the link preview 128 may be generated by the content provider system 106 even for a service provider system 108 that attempts to generate link previews, itself, and thus maintains control of these previews at the content provider system 106.

The link preview 128 may be customized in a variety of different ways by the preview generation module 126. Examples of customization include customizations based on a communication platform 118, via which, the link preview 128 is to be communicated and viewed. This may be used, for instance, to address available resolutions, theme colors, image sizes, and output options of the communication platform 118. This may also be used to select portions of the digital content 120, such as to increase a likelihood of initiation of a user interaction, such as conversion of a good or service associated with the digital content 120.

Other customization examples are also contemplated, such as to address a temporal consideration, such as a holiday. The link preview 128, for instance, may be configured to be interactive to support user interaction prior to being used to initiate navigation to a corresponding network address, as part of initiating this navigation, and so forth. The link preview 128, for instance, may output an animation responsive to detection of a "hover" (e.g., gesture, cursor) over the link, output a digital video, include game or question and answer functionality, and so forth. In another instance, the link preview 128 includes dynamic display functionality that is usable in conjunction with selection of the link preview 128 to initiate navigation to the network address, e.g., as an animation that dynamically expands upon digital content available via the link, an ability to play digital media including audio and video through interaction with the link preview 128, and so forth. In this way, the content provider system 106 may customize generation of the link preview 128 as desired, further discussion of which is included in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Dynamic Link Preview Generation

Figure 2:
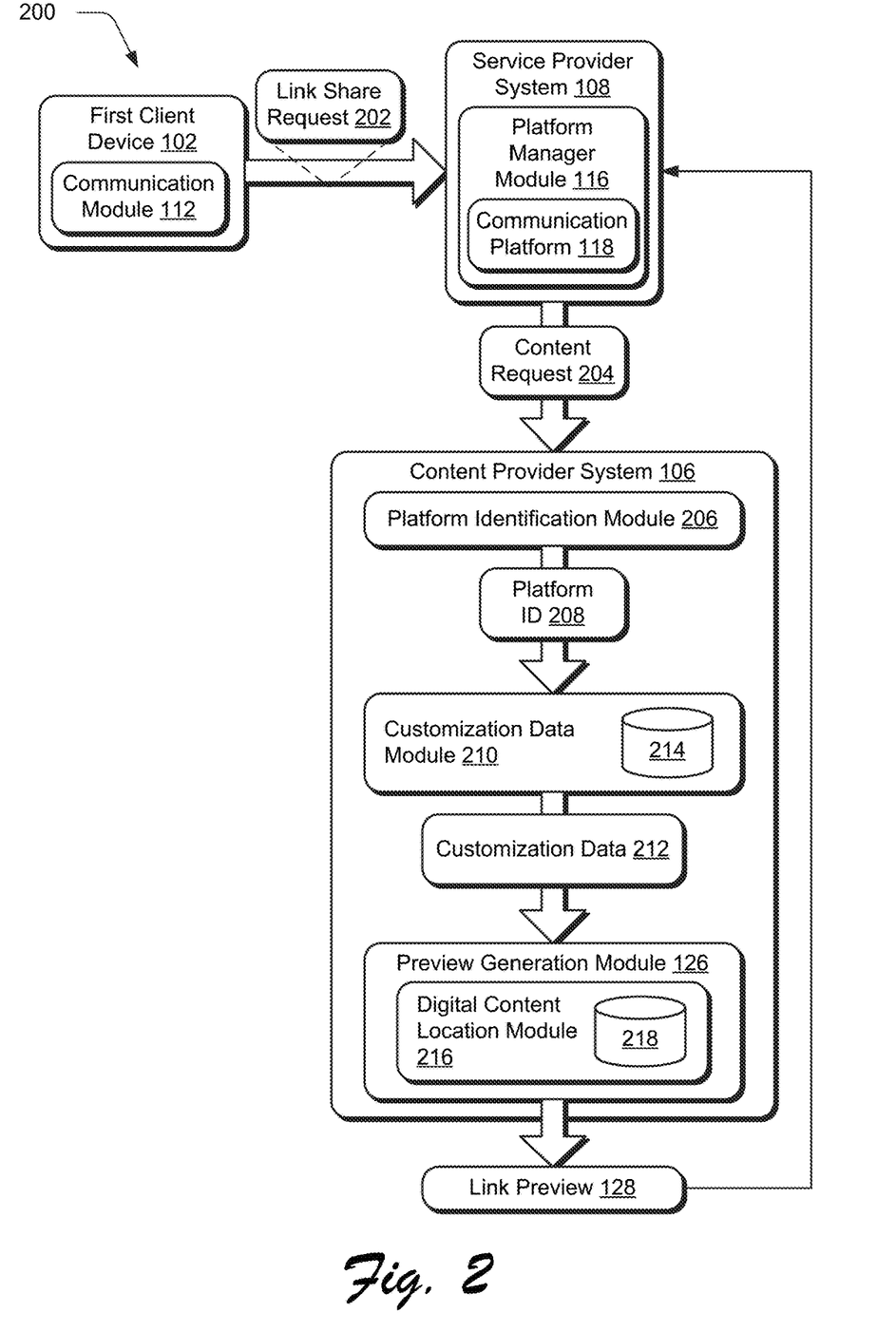
FIG. 2 depicts a system in an example implementation showing operation of a preview generation module of FIG. 1 in greater detail as generating a link preview.
Figure 3:
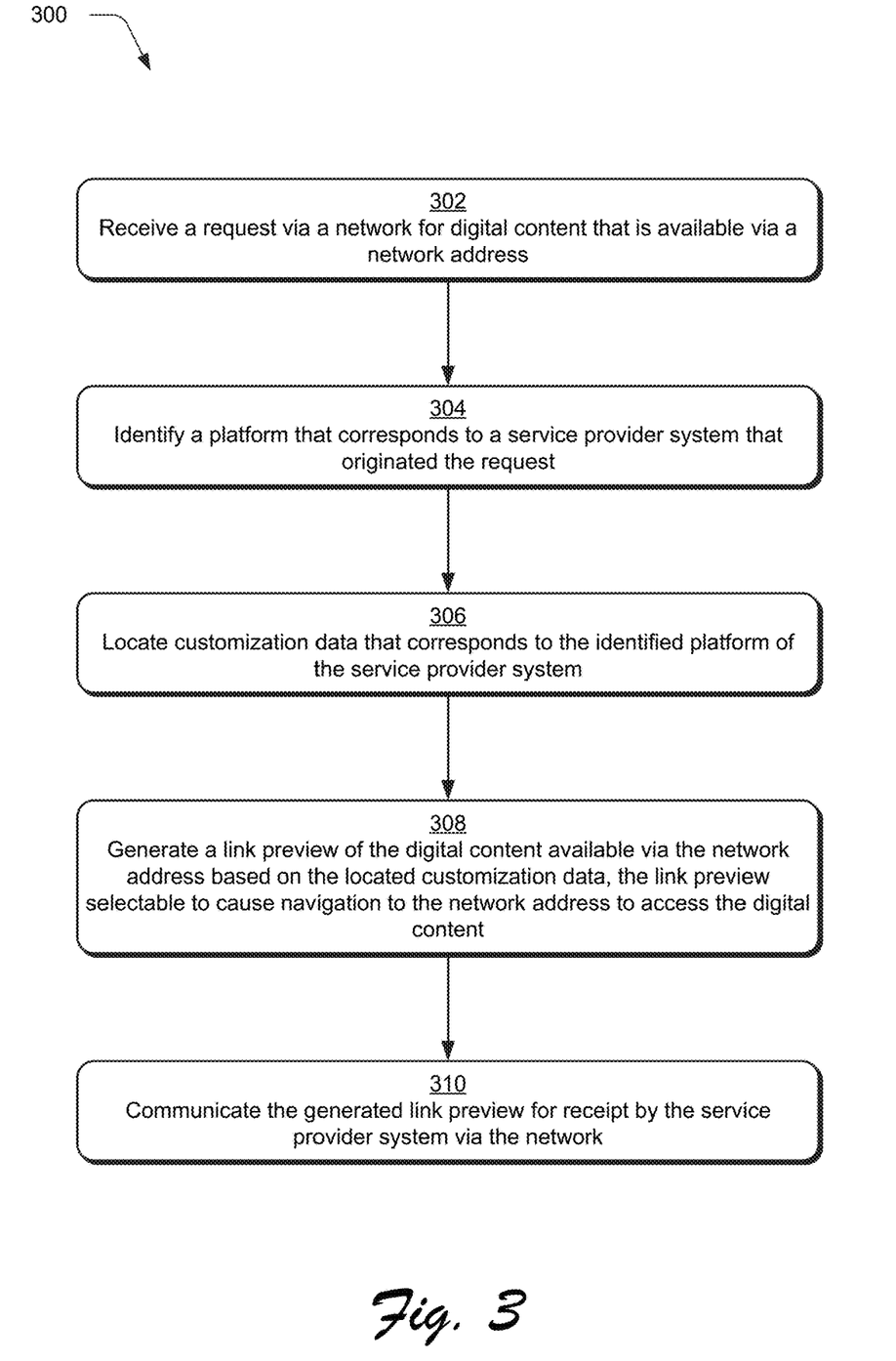
FIG. 3 is a flow diagram depicting a procedure in an example implementation in which a link preview is generated based on customization data located for a particular platform that originated the request.

FIG. 2 depicts a system 200 in an example implementation showing operation of the preview generation module 126 of FIG. 1 in greater detail as generating a link preview 128. FIG. 3 depicts a procedure 300 in an example implementation in which a link preview is generated based on customization data located for a particular platform that originated the request.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

To begin in this example, a first client device 102 interacts with a service provider system 108. The service provider system 108 includes a platform manager module 116 supporting a communication platform 118, via which, the first client device 102 may communicate with the second client device 104 via the network 110. The communication platform 118 may support a wide variety of communications delivered in a wide variety of ways via the network 110. Examples of these communications instant messaging, social network communications (e.g., "shares" or posts), electronic messages, and so forth. Examples of communication platforms include Apple® iMessage® and are also supported as part of social network systems including Facebook®, Instagram®, LinkedIn®, Snapchat®, and so forth as previously described.

The first client device 102, via a communication module 112 (e.g., browser, network enabled application, etc.) initiates a link share request 202 which is communicated to the service provider system 108. The first client device 102, for instance, may navigate via a browser or dedicated application to a network address and wish to "share" digital content available at the network address, e.g., a webpage, digital media, and so forth, via the communication platform 118.

A user of the first client device 102, for example, may navigate to a webpage and select a "share" feature via a user interface. Selection of the share feature causes output of options of communication platforms 118 by the communication module 112, via which, the user wishes to share a link to the webpage, e.g., via an instant message, post in a social media service, and so forth. In response, the communication module 112 communicates the link share request 202 to a service provider system 108 that implemented the selected communication platform 118.

Receipt of the link share request 202 by the service provider system 108 causes the platform manager module 116 to access the network address associated with the link share request 202 in order to generate a link preview. The service provider system 108, for instance, may be configured to support Open Graph tags, e.g., "og:title" for a title and "og:image" for an image. The title and image received by the service provider system 108 in response to the request is then to be used in an OG tag scenario by the service provider system 108 to generate the link preview, itself. However, in this example the content provider system 106 generates the link preview 128, itself, which is then passed to the service provider system 108 for use by the client devices as the digital image. As a result, the content provider system 106 controls how the digital content is presented by the service provider system 108 as part of the link preview 128.

A content request 204, for instance, is received by the content provider system 106 via a network 110 for digital content that is available via a network address (block 302). The content request 204, for instance, may follow the Open Graph tags and request a title and image associated with the network address, e.g., "og:title" for a title and "og:image" for an image. The content request 204 for the image "og:image," for instance, instead of simply providing a digital image from a webpage may be used by the content provider system 106 to obtain a link preview 128. As such, even in instances in which the service provider system 108 is configured to generate a link preview, the content provider system 106 may instead generate this preview and pass it to the service provider system 108 as further described below. This gives a degree of control to the content provider system 106 in generating the link preview 128 that is not possible using conventional techniques. In another example, the content request 204 requests digital content that is generally available via the network address, e.g., an entirety of a webpage.

A communication platform 118 is then identified that corresponds to a service provider system 108 that originated the request (block 304). In the illustrated example, the content provider system 106 includes a platform identification module 206 that is configured to identify a platform ID 208 from the content request 204. The content request 204, for instance, may include a header that specifies a network domain that originated the request. From this network domain, the platform identification module 206 may determine the communication platform 118 used by the service provider system 108 to support communication between client devices.

The platform ID 208 is then passed from the platform identification module 206 as an input to a customization data module 210 in the illustrated example. The customization data module 210 is representative of functionality to locate customization data 212 from a storage device 214 that corresponds to the identified communication platform 118 of the service provider system 108 (block 306). The customization data 212, for instance, may describe display characteristics, color themes, resolutions, aspect ratios, types of digital content supported, and so forth as used by the communication platform 118. The customization data 212 may also describe digital content that has been successful in initiating a user action via the identified communication platform 118, e.g., conversion of a good or service associated with digital content available via the network address and thus serve as digital marketing content (e.g., advertisements) as further described below.

The customization data 212 is passed from the customization data module 210 as an input to a preview generation module 126. A link preview 128 is then generated by the preview generation module 126 of the digital content available via the network address based on the customization data 212. The link preview is selectable to cause navigation to the network address to access the digital content (block 308). Continuing with the example above, the content request 204 may include Open Graph tags to request a title and image associated with the network address, e.g., "og:title" for a title and "og:image" for a digital image, which is then to be used by the service provider system 108, itself, to generate the link preview 128.

In the illustrated example, however, the OG tag for the digital image (or title) causes the content provider system 106 to instead generate the link preview 128 and pass it back to the service provider system 108 as the digital image that is to be used to generate the link by the service provider system 108. To do so in one example, a digital content location module 216 is utilized to locate digital content available via the network address, e.g., from a storage device 218. The preview generation module 126 then renders the digital content (e.g., as an HTML page) in headless chrome and captures a screenshot to generate a digital image, e.g., having a size, resolution, aspect ratio, and so on as specified by the customization data 212.

The captured screenshot is then used by the preview generation module 126 as the link preview 128 which is communicated by the content provider system 106 via the network 110 for receipt by the service provider system 108 (block 310). In this way, the preview generation module 126 of the content provider system 106 may control how digital content that originates from the content provider system 106 is represented as part of the link preview 128 used by the service provider system 108. The link preview 128 may then be communicated by the service provider system 108 to the second client device 104, which may render the link preview 128 in a user interface as illustrated in FIG. 1 and is selectable to cause the communication module 114 to navigate to the network address and obtain the digital content available via this network address.

The dynamic link preview generation techniques described above may be performed in real time as the content request 204 is received. As a result, this functionality is available for millions of webpages without requiring offline generation and storage of the link previews 128. In an implementation, however, the link preview 128 is cached in a storage device for use in subsequent requests, e.g., for a defined amount of time, based on an amount of past usage, and so forth. The link preview may also be generated "offline," e.g., before receipt of the content request 204.

Figure 4:
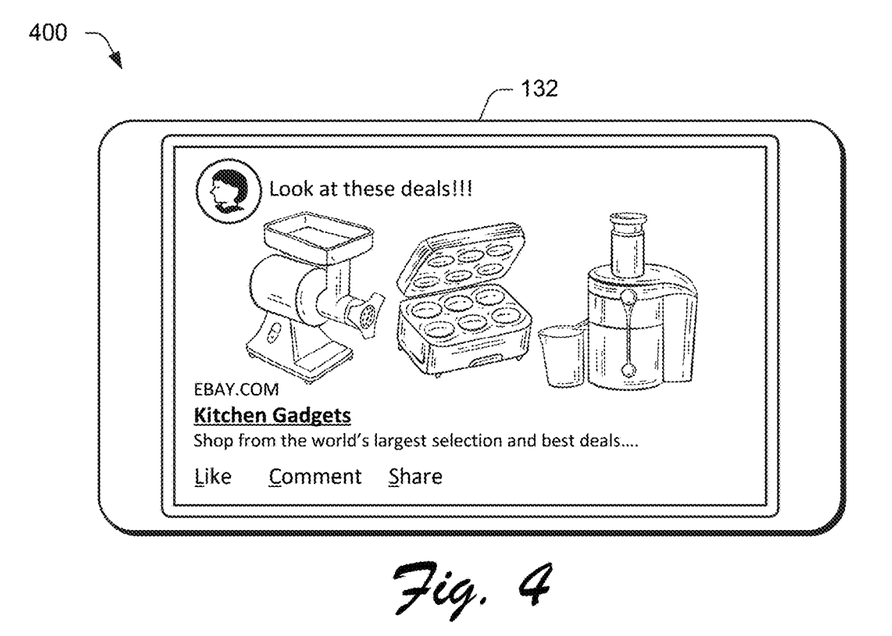
FIGS. 4 and 5 depict respective examples of link previews generated for different communication platforms.
Figure 5:
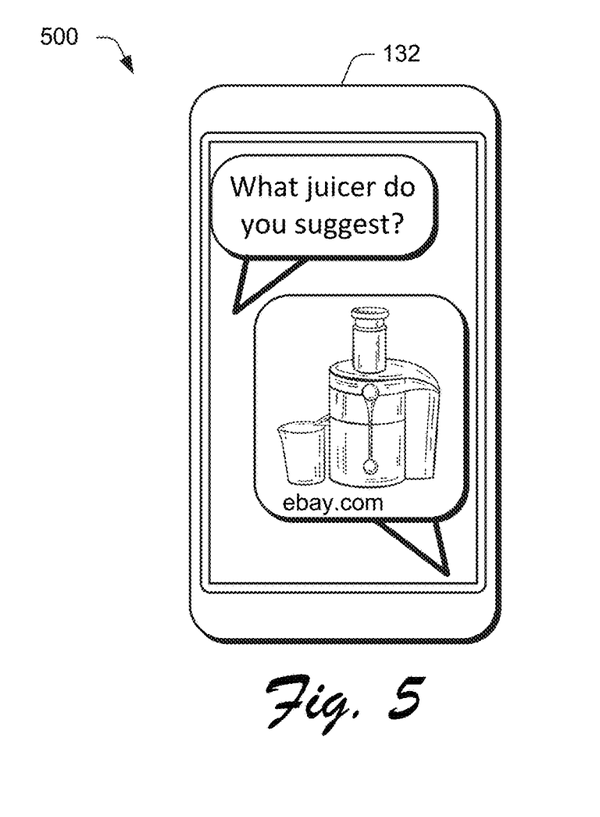

FIGS. 4 and 5 depict respective examples of link previews 400, 500 generated for different communication platforms 118. The link preview 400 of FIG. 4 is configured to take advantage of use as a post in a newsfeed as part of a social network system. This includes formatted for display in a generally landscape orientation with a selection of multiple digital images. The link preview 500 of FIG. 5, however, is configured to output in a portrait orientation with limited display area as an instant message. In this way, link previews 400, 500 for the same digital content available from the same network address may be generated differently to address the communication platform 118, via which, the link preview is to be communicated.

Figure 6:
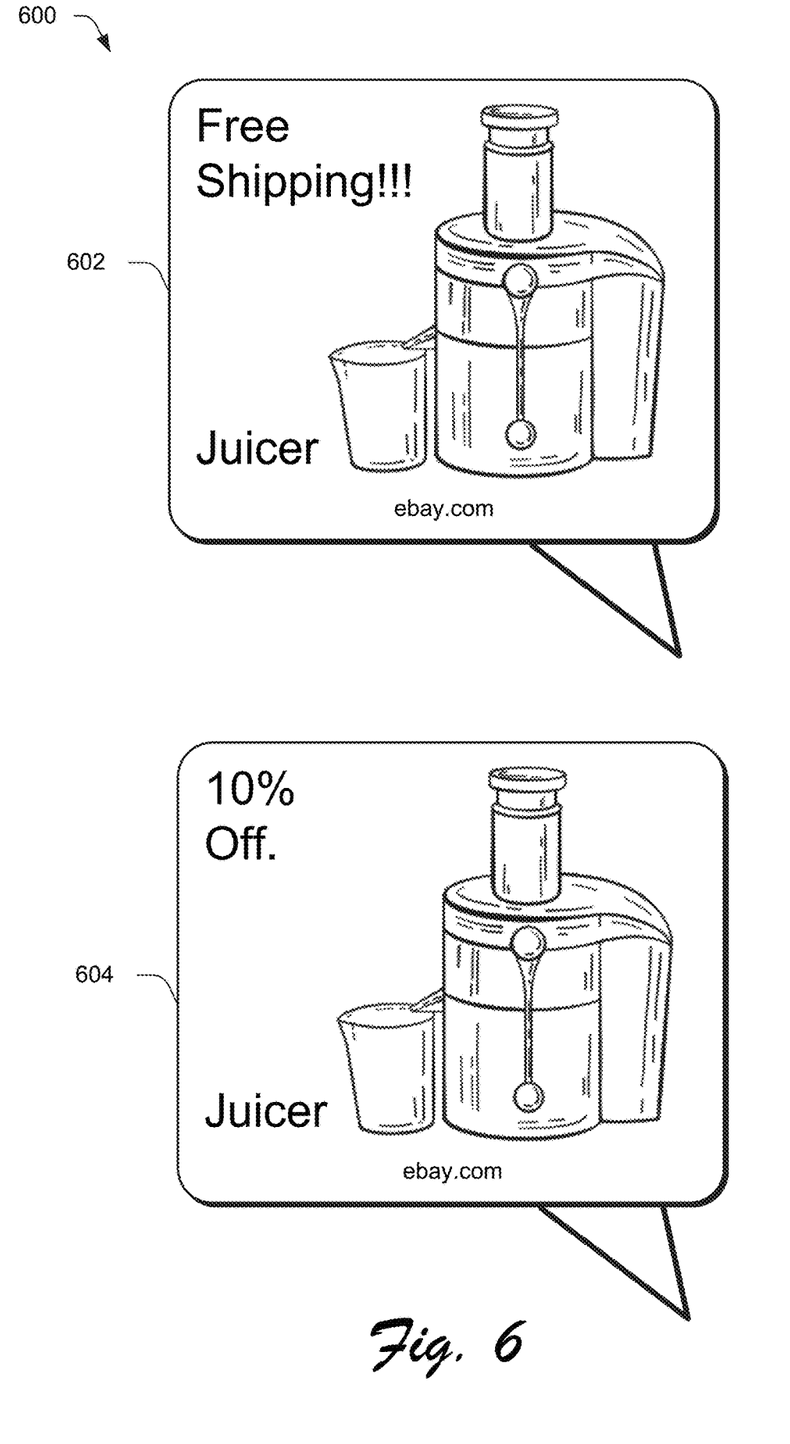
FIG. 6 depicts an example implementation in which a link preview is configured to encourage a user to take an action, such as conversion of a good or service associated with the digital content available via the network address as digital marketing content.

FIG. 6 depicts an example implementation 600 in which a link preview is configured to encourage a user to take an action, such as conversion of a good or service associated with the digital content available via the network address as digital marketing content. The preview generation module 126 in this example is configured to generate the link preview 128 based on a variety of factors in order to increase a likelihood that a user undertakes an action upon viewing the link preview 128, e.g., conversion such as "clicking" on the link, subsequent purchase of a good or service associated with a network address, for which, the link preview 128 is generated, and so forth.

The preview generation module 126, for instance, may generate a link preview 602 that includes an offer for "free shipping" and another link preview 604 as "10% off" for the same communication platform 118. As part of A/B testing, the preview generation module 126 may then learn which options perform best in achieving the desired result. As a result, the link preview 128 may support increased functionality and revenue opportunities that are not available using conventional techniques.

Figure 7:
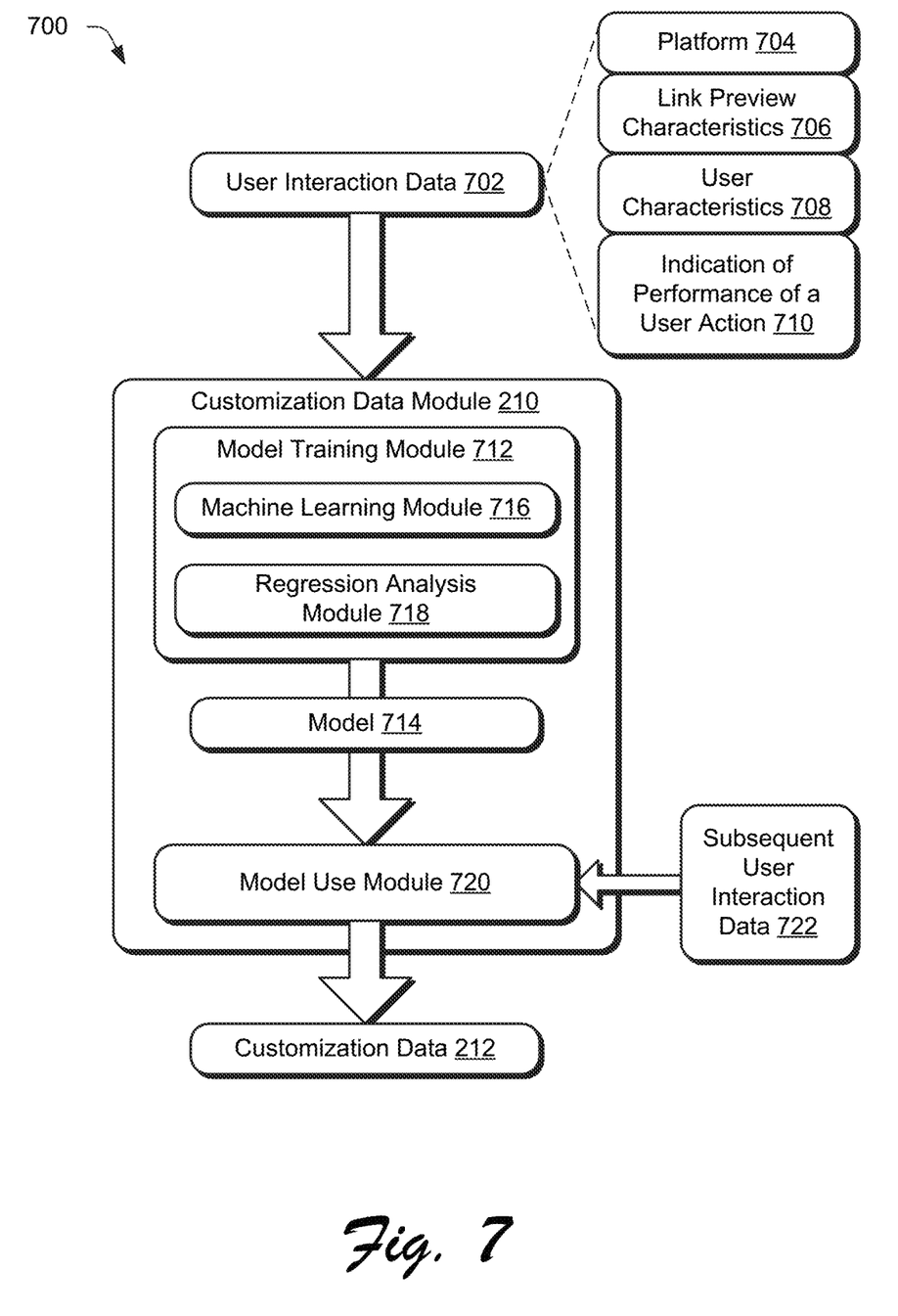
FIG. 7 depicts a system in an example implementation in which a customization data module generates a model that is used to control customizations applied to link previews.
Figure 8:
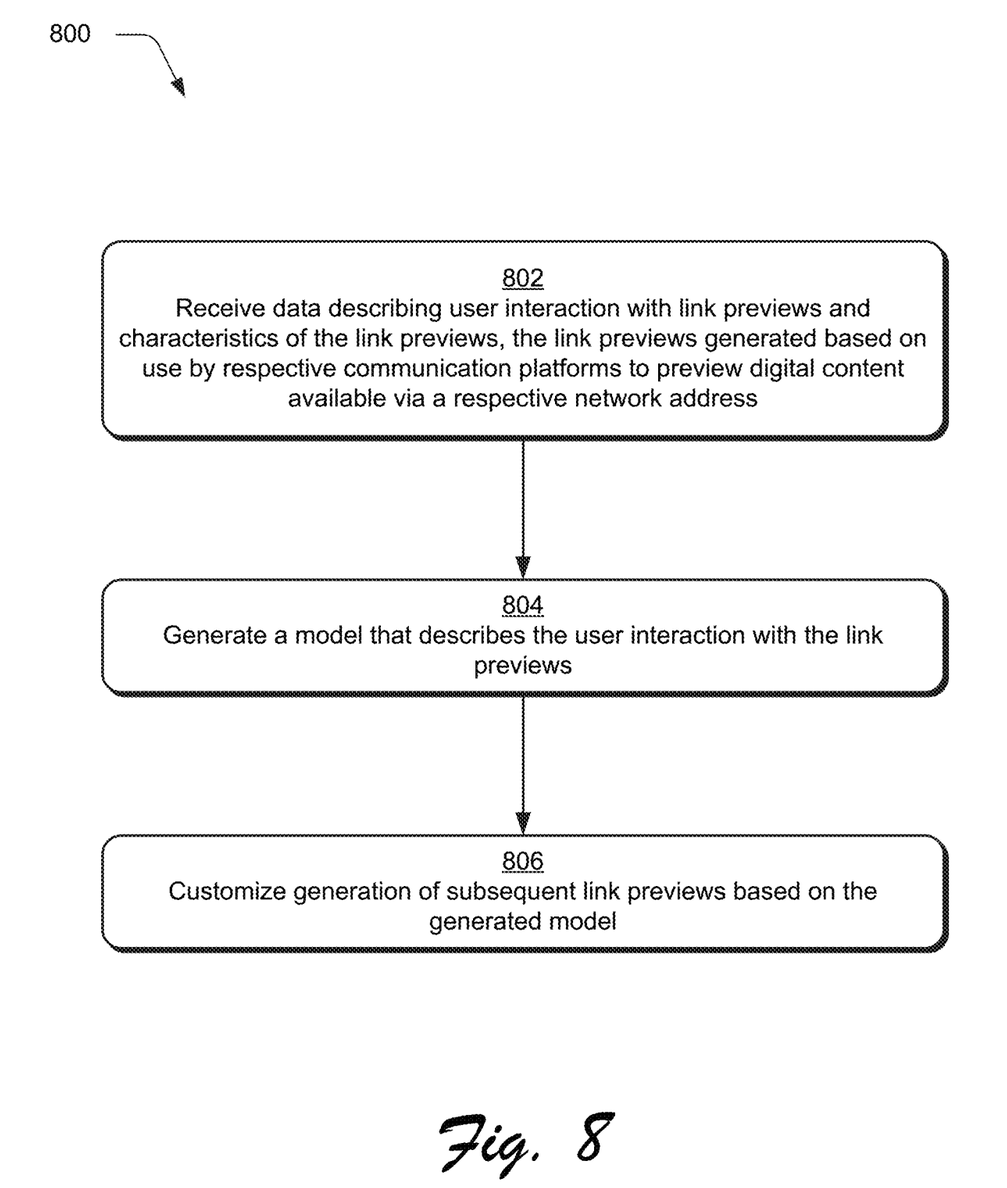
FIG. 8 is a flow diagram depicting a procedure in an example implementation in which a model is generated to escribe user interaction with link preview to customize generation of subsequent link previews.

FIG. 7 depicts a system 700 in an example implementation in which a customization data module generates a model that is used to control customizations applied to link previews. FIG. 8 depicts a procedure 800 in an example implementation in which a model is generated to describe user interaction with link previews to customize generation of subsequent link previews. This customization may be based on a user that initiated generation of the link, a user that is to receive the link, and so forth.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 7 and 8.

To begin in this example, user interaction data 702 is received by the customization data module 210 describing user interaction with link previews and characteristics of the link previews. The link previews are generated based on use by respective communication platforms to preview digital content available via a respective network address (block 802). The user interaction data 702, for instance, may describes a communication platform 704, for which, the link preview is generated, link preview characteristics 706 (e.g., digital images, colors, types of content, and so on included in the link preview), user characteristics 708 (e.g., demographic information such as age, gender, geographic location) of users that interacted with the link previews (e.g., initiated the link preview 128 and/or received the link preview 128), indications of performance of a user action 710 (e.g., whether the link preview resulted in conversion), and so forth.

The user interaction data is then received as an input by a model training module 712 to generate a model 714 that describes the user interaction with the link previews (block 804). A variety of techniques may be performed. In a first example, the model training module 712 uses a regression analysis module 718 to generate the model 714 using regression analysis. Regression analysis is a statistical technique used to estimate relationships among variables in the user interaction data 702.

In a second example, a machine learning module 716 is used to train a model using machine learning techniques in which the user interaction data 702 is used to train the model 714 using a loss function. Models trained using machine learning may include decision trees, support vector machines, linear regression, logistic regression, Bayesian networks, random forest learning, dimensionality reduction algorithms, boosting algorithms, artificial neural networks, deep learning, and so on. Thus, a model 714 trained using machine learning is configured to make high-level abstractions in data by generating data-driven predictions or decisions from the known input data.

The model 714, once trained, is then passed to a model use module 720 to generate customization data 212 based on subsequent user interaction data 722 to customize subsequent link previews (block 806). The subsequent user interaction data 722, for instance, may describe a communication platform, link preview characteristics, user characteristics (e.g., sender or receiver), and/or indication of performance of a user action 710. Based on this information, the customization data 212 is generated to describe characteristics that are successful in achieving a desired result, e.g., conversion of a good or service. In this way, the link preview 128 may be configured to take advantage of digital marketing techniques to increase a richness of the link preview 128, which is not possible in conventional techniques. The customization data 212, for instance, may be based on previous user interactions and then used to customize generation of subsequent links, e.g., to increase a likelihood of conversion.

Example System and Device

Figure 9:
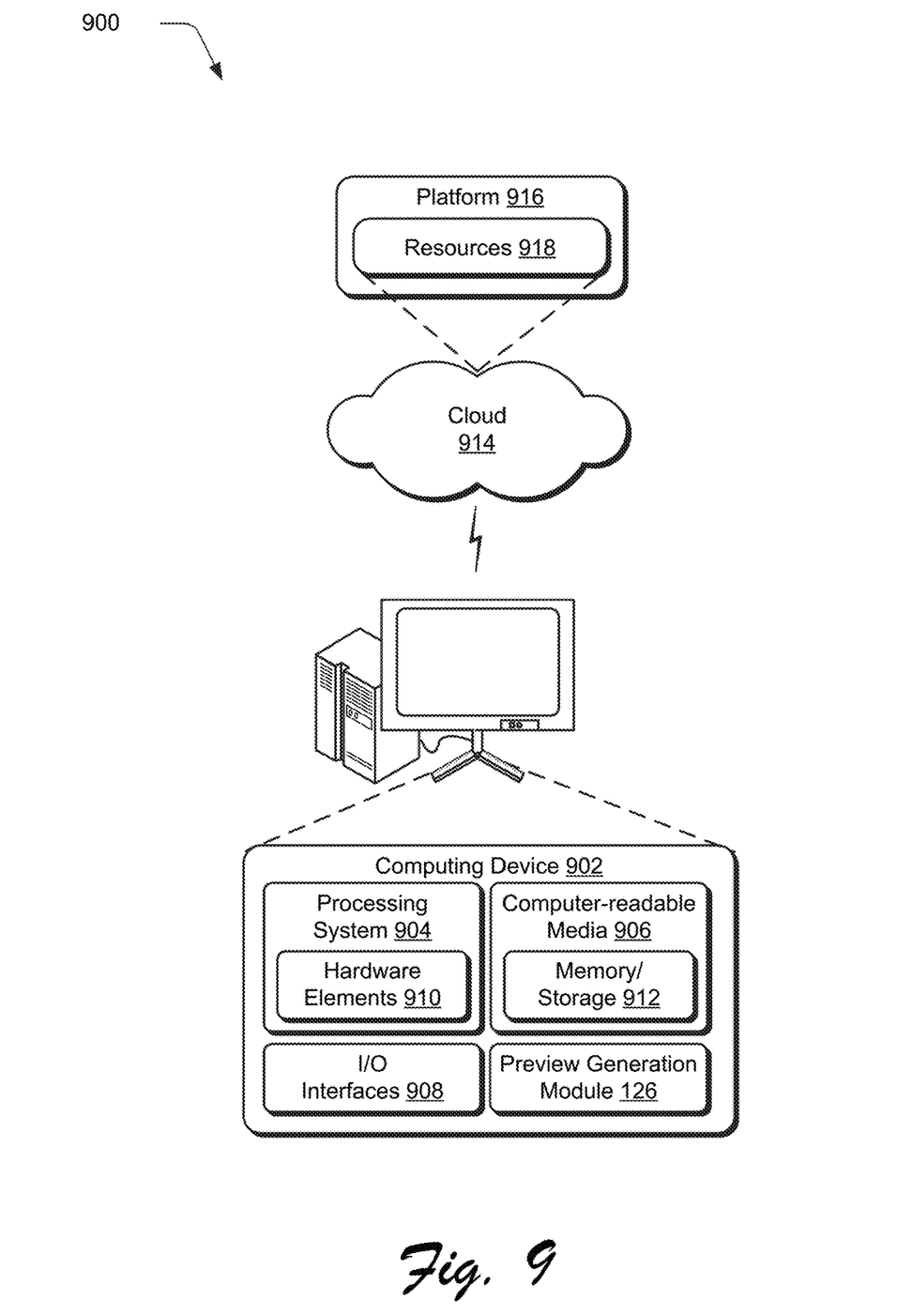
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the preview generation module 126. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    receiving, by the at least one computing device, a request via a network for digital content that is available via a network address, in which the request is a link share request;
    based on the request received, identifying, by the at least one computing device, a platform that corresponds to a service provider system that originated the request;
    locating, by the at least one computing device, customization data that corresponds to the identified platform;
    generating, by the at least one computing device, a link preview of digital content available via the network address based on the located customization data; and
    caching, by the at least one computing device, the link preview of the digital content, the link preview being selectable to cause navigation to the network address to access the digital content.

2. The method as described in claim 1, wherein the service provider system that originated the request includes a communication platform that supports communication between a first client device and a second client device.

3. The method as described in claim 2, wherein the request is originated by the service provider system responsive to an input received from the first client device by the service provider system to share the network address in a communication with the second client device.

4. The method as described in claim 2, wherein the digital content is a webpage and the service provider system implements a social network, via which, the link preview is to be shared.

5. The method as described in claim 1, wherein the identifying is based on an identifier of a network domain from which the request originated.

6. The method as described in claim 1, wherein the customization data describes a size to be used to generate the link preview.

7. The method as described in claim 1, wherein the customization data describes which digital image of a plurality of digital images that are included as part of the digital content is to be included in the link preview.

8. The method as described in claim 1, wherein the link preview is user selectable to navigate to the network address.

9. The method as described in claim 1, wherein the customization data for the identified platform identifies a portion of the digital content for inclusion in the link preview based on a likelihood of causing selection of the link preview to cause navigation to the network address.

10. The method as described in claim 1, wherein the customization data for the identified platform identifies a portion of the digital content for inclusion in the link preview based on a likelihood of causing conversion of a good or service associated with the digital content.

11. The method as described in claim 1, wherein the customization data for the identified platform identifies a portion of the digital content for inclusion in the link preview based on machine learning using a model trained based on previous link previews generated for the identified platform.

12. The method as described in claim 1, wherein the generating of the link preview includes rendering the digital content having a size based on the customization data.

13. The method as described in claim 1, wherein the customization data causes the link preview generated for the platform to differ from a different link preview generated for a different platform.

14. A non-transitory computer-readable storage medium comprising instructions that are executable by at least one processor to perform operations comprising:
    receiving a request via a network for digital content that is available via a network address, in which the request is a link share request;
    based on the request received, identifying an platform that corresponds to a service provider system that originated the request;
    locating customization data that corresponds to the identified platform;
    generating a link preview of digital content available via the network address based on the located customization data; and
    caching the link preview of the digital content, the link preview being selectable to cause navigation to the network address to access the digital content.

15. The non-transitory computer-readable storage medium as described in claim 14, wherein the service provider system that originated the request includes a communication platform that supports communication between a first client device and a second client device.

16. The non-transitory computer-readable storage medium as described in claim 15, wherein the request is originated by the service provider system responsive to an input received from the first client device by the system to share the network address in a communication with the second client device.

17. The non-transitory computer-readable storage medium as described in claim 14, wherein the customization data describes which digital image of a plurality of digital images that are included as part of the digital content is to be included in the link preview.

18. A system comprising:
    one or more hardware processors; and
    a machine-readable storage medium storing instructions that are executable by the one or more hardware processors to perform operations comprising:
        receiving a request via a network for digital content that is available via a network address, in which the request is a link share request; address;
        based on the request received, identifying a platform that corresponds to a service provider system that originated the request;
        locating customization data that corresponds to the identified platform;
        generating a link preview of digital content available via the network address based on the located customization data; and
        caching the link preview of the digital content, the link preview being selectable to cause navigation to the network address to access the digital content.

19. The system of claim 18, wherein the customization data is based on demographic data of the platform.

20. The system of claim 18, wherein the platform implements a social network.

* * * * *